(12) United States Patent
Yamane et al.

(10) Patent No.: US 8,263,724 B2
(45) Date of Patent: Sep. 11, 2012

(54) FLUORINE-CONTAINING SURFACE TREATING AGENT AND AN ARTICLE SURFACE-TREATED THEREWITH

(75) Inventors: Yuji Yamane, Annaka (JP); Noriyuki Koike, Takasaki (JP); Hirofumi Kishita, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 542 days.

(21) Appl. No.: 12/544,668

(22) Filed: Aug. 20, 2009

(65) Prior Publication Data

US 2010/0076211 A1 Mar. 25, 2010

(30) Foreign Application Priority Data

Aug. 21, 2008 (JP) .................. 2008-213133

(51) Int. Cl.
*C08G 77/46* (2006.01)
*C08G 77/04* (2006.01)

(52) U.S. Cl. .............. 528/25; 528/31; 528/34; 524/462; 525/474; 428/447

(58) Field of Classification Search .................... 528/25, 528/31, 35; 524/462; 525/474; 428/447
See application file for complete search history.

(56) References Cited

U.S. PATENT DOCUMENTS

| 6,706,359 | B2 | 3/2004 | Mino et al. |
| 2007/0149746 | A1 | 6/2007 | Yamane et al. |

FOREIGN PATENT DOCUMENTS

| EP | 1813640 | | 8/2007 |
| JP | 11-29585 | A | 2/1999 |
| JP | 2001-188102 | A | 7/2001 |
| JP | 2002-367229 | A | 12/2002 |
| JP | 2007-197425 | A | 8/2007 |

*Primary Examiner* — Elvis O Price
(74) *Attorney, Agent, or Firm* — Birch, Stewart, Kolasch & Birch, LLP

(57) ABSTRACT

The purpose of the present invention is to provide a surface treating agent which provides a surface where stain does not easily adhere, does not stand out and is easily wiped off.
The present invention is a perfluoropolyether group-containing polyorganosiloxane represented by the following formula (1) and a surface treating agent comprising the same,

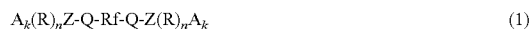

$$A_k(R)_n\text{-}Z\text{-}Q\text{-}Rf\text{-}Q\text{-}Z(R)_n A_k \quad (1)$$

wherein Rf is a divalent perfluoropolyether group; Q is a divalent group linking Rf with Z; Z is a polyorganosiloxane group having at least three siloxane bonds with its valency being trivalent to undecavalent; R is a monovalent organic group having 8 to 40 carbon atoms, n is an integer of from 1 to 8; A is a group represented by the following formula (2); and k is an integer of from 1 to 9, provided that a total of n+k=the valency of Z−1

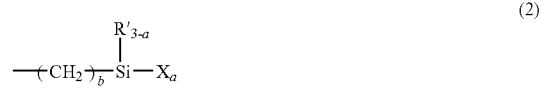

wherein R' is an alkyl group having 1 to 4 carbon atoms or a phenyl group; X is a hydrolysable group, a is 2 or 3; and b is an integer of from 2 to 10.

24 Claims, 1 Drawing Sheet

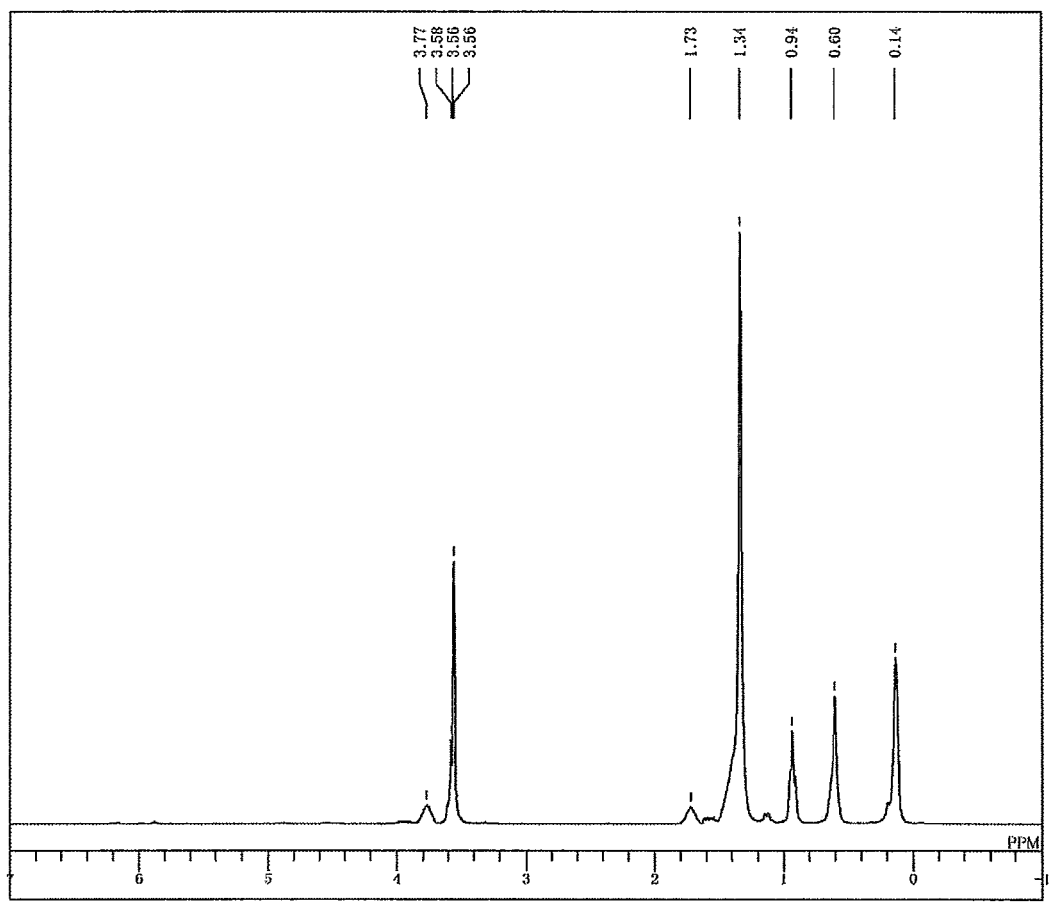

FLUORINE-CONTAINING SURFACE TREATING AGENT AND AN ARTICLE SURFACE-TREATED THEREWITH

CROSS REFERENCES

This application claims the benefits of Japanese Patent Application No. 2008-213133 filed on Aug. 21, 2008, the contents of which are hereby incorporated by reference.

FIELD OF THE INVENTION

The present invention relates to a fluorine-containing surface treating agent composition, specifically, a surface treating agent composition comprising an organosiloxane having a perfluoroether group and a particular functional group, which makes fat or sebum on a surface less noticeable and easy to be wiped off. Further, the present invention relates to an anti-reflection filter, a hard coat film, a touch panel substrate, a polarization plate, glass and a resin film which are surface-treated with the afore-mentioned treating agent.

BACKGROUND OF THE INVENTION

Generally, perfluorooxyalkylene group-containing compounds, hereinafter referred to "perfluoroether group-containing compounds", have very small surface free energy, and, therefore, have water- and oil-repellency, a releasing property, and a stainproof property. The afore-mentioned compounds are widely used to utilize their properties as a commercial water- and oil-repellent, stainproof agent for paper and fiber, water- and oil-repellent, stainproof agent for display surfaces, and anti-oil agent for precision instruments.

It is known to use a silane in order to make a perfluoroether group adhere tightly to a substrate. For instance, patent literature 1 listed below discloses a fluoroaminosilane compound and patent literature 2 discloses an anti-reflection film whose stain-preventive layer contains the silane coupling agent represented by the following formula (7). However, the silane coupling agent has such problems that an amount of a hydrolysable group per molecule is insufficient; accordingly too much time is required for the agent to cure; and adhesion of the agent to a substrate is bad.

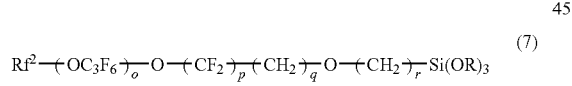
(7)

wherein $Rf^2$ is a linear or branched perfluoroalkyl group having 1 to 16 carbon atoms, R is an alkyl group having 1 to 10 carbon atoms, o is an integer of from 1 to 50, p is an integer of from 0 to 6, q is an integer of from 0 to 3, and r is an integer of from 0 to 3, provided that $0 < p+q \leq 6$.

To solve the afore-mentioned problems, patent literature 3 discloses a silane coupling agent which has a perfluoropolyether group having two or more hydrolysable groups on its ends. The treating agent is good in adhesion to a substrate and provides a water- and oil-repellent surface where a slipping property is good and stain is easily wiped off.

For the requirements, "to make a surface stainproof" and "to make stain easily removed", the afore-mentioned treating agent meets the former requirement by its water- and oil-repellency or low surface energy, and the latter requirement by its improved surface slipping property, respectively. However, recently, it is pointed out that stain such as fingerprint and sweat stands out as a white body and is more noticeable on surfaces of anti-reflection films, protecting films, and filters which have been surface treated with the afore-mentioned treating agent than on a surface which is not surface treated.

In order to make fat and oil stain less noticeable, it is known to treat a surface with a surface treating agent which comprises a hydrocarbon group, whereby the hydrocarbon group is exposed on the surface, then, the stain spreads on the surface and, therefore, the stain becomes less noticeable (patent literature 4). However, the treated surface becomes lipophilic and, therefore, the fat and oil stain adheres more easily to the surface and is more difficult to be removed than on an untreated surface.

[Patent literature 1] Japanese Patent Application Laid-Open No. Hei-11-29585
[Patent literature 2] Japanese Patent Application Laid-Open 2001-188102
[Patent literature 3] Japanese Patent Application Laid-Open 2007-197425
[Patent literature 4] Japanese Patent Application Laid-Open 2002-367229

DISCLOSURE OF THE INVENTION

The Problems to be Solved by the Invention

A purpose of the present invention is to provide a surface treating agent which gives a surface which has a good balance among three requirements: stain does not adhere easily; stain does not stand out; and stain is easily wiped off.

Means to Solve the Problems

The present invention is a polyorganosiloxane having a perfluoropolyether group represented by the following formula (1) and a surface treating agent comprising the same, $$A_k(R)_nZ\text{-}Q\text{-}Rf\text{-}Q\text{-}Z(R)_nA_k \qquad (1)$$

wherein Rf is a divalent perfluoropolyether group; Q is a divalent group linking Rf with Z; Z is a polyorganosiloxane group having at least three siloxane bonds with its valency being trivalent to undecavalent; R is a monovalent organic group having 8 to 40 carbon atoms, n is an integer of from 1 to 8; A is a group represented by the following formula (2); and k is an integer of from 1 to 9, provided that n+k=(the valency of Z−1),

(2)

wherein R' is an alkyl group having 1 to 4 carbon atoms or a phenyl group; X is a hydrolysable group, a is 2 or 3; and b is an integer of from 2 to 10.

Effects of the Invention

The polyorganosiloxane of the present invention has, near the ends of the molecule, a lipophilic group which has a particular number of carbon atoms and provides a film after cured. Accordingly, even when sebum adheres to a surface of the film, the stain does not stand out and is easily wiped off. The present polyorganosiloxane can be used in various coating applications.

BRIEF DESCRIPTION ON THE DRAWING

FIG. 1 is an NMR chart of compound 1 prepared in Example 1.

BEST EMBODIMENTS OF THE INVENTION

The perfluoropolyether group-containing polyorganosiloxane of the present invention is represented by the following formula (1), $$A_k(R)_n Z\text{-}Q\text{-}Rf\text{-}Q\text{-}Z(R)_n A_k \quad (1)$$

wherein Rf is a divalent perfluoropolyether group; Q is a divalent group linking Rf with Z; Z is a polyorganosiloxane group having at least three siloxane bonds with its valency being trivalent to undecavalent; R is a monovalent organic group having 8 to 40 carbon atoms, n is an integer of from 1 to 8; A is a group represented by the following formula (2); and k is an integer of from 1 to 9, provided that n+k=the valency of Z−1,

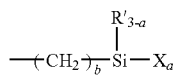

$$\text{—}(CH_2)_b\text{—}\underset{\underset{X_a}{|}}{\overset{\overset{R'_{3-a}}{|}}{Si}}\text{—}X_a \quad (2)$$

wherein R' is an alkyl group having 1 to 4 carbon atoms or a phenyl group; X is a hydrolysable group, a is 2 or 3; and b is an integer of from 2 to 10.

R is an alkyl group having 8 to 40 carbon atoms, preferably 10 to 20 carbon atoms. Examples of R include an octyl group, a decyl group, a dodecyl group, a tridecyl group, a tetradecyl group, a hexadecyl group, a heptadecyl group, and an octadecyl group. Among these, a tetradecyl group and a hexadecyl group are particularly preferred. If the number of carbon atoms is less than the afore-mentioned lower limit, the effect to make stain less noticeable is insufficient. If the number of the carbon atoms is more than the upper limit, stain is not easily wiped off. "n" is an integer of from 1 to 10, preferably from 1 to 5, more preferably from 2 to 4. If n is lower than the afore-mentioned lower limit, the effect to make stain less noticeable is insufficient. If n is more than the afore-mentioned upper limit, an amount of group A is relatively less and, therefore, adhesion to a substrate lowers.

In formula (2), X is a hydrolysable group, such as an alkoxy group having 1 to 10 carbon atoms such as a methoxy group, an ethoxy group, a propoxy group, and a butoxy group; an oxyalkoxy group having 2 to 10 carbon atoms such as a methoxymethoxy group and a methoxyethoxy group; an acyloxy group having 1 to 10 carbon atoms such as an acetoxy group; an alkenyloxy group having 2 to 10 carbon atoms such as an isopropenoxy group; and a halogen atom such as a chlorine atom, a bromine atom, and an iodine atom. Inter alia, a methoxy group, an ethoxy group, an isopropenoxy group, and a chlorine atom are preferred.

R' is, for instance, an alkyl group having 1 to 4 carbon atoms or a phenyl group, specifically a methyl group, an ethyl group and a phenyl group. Inter alia, a methyl group is preferred. "a" is 2 or 3, and preferably 3 for better reactivity and adhesion to a substrate. "b" is 2 or more, and preferably 2 to 5 for better balance between adhesion to a substrate and surface properties.

"k" indicates the number of A, and may be different from each other on both ends. Preferably, a ratio of n with k, n/k, is 1/5 to 5, more preferably 1/3 to 3, where k is the number of the long chain alkyl groups, whereby the both good adhesion to a substrate and less noticeable stain can be attained.

Rf is a divalent perfluoroether group, optionally branched. For the perfluoroether group, mention may be made of a group represented by formula —$(C_c F_{2c} O)_d$—, wherein c may be different among repeating units, and is an integer of from 1 to 6, preferably from 1 to 4, and d is an integer of from 1 to 100, preferably from 2 to 80, more preferably 10 to 50.

Examples of the repeating unit represented by —$C_c F_{2c} O$— include the following units, or a combination of two or more of these.

—$CF_2 O$—
—$CF_2 CF_2 O$—
—$CF_2 CF_2 CF_2 O$—
—$CF(CF_3)CF_2 O$—
—$CF_2 CF_2 CF_2 CF_2 O$—
—$CF_2 CF_2 CF_2 CF_2 CF_2 CF_2 O$—
—$C(CF_3)_2 O$—

Preferably, Rf is selected from the group consisting of the groups represented by the following general formula (3), (4) or (5), $$\text{—}C_e F_{2e}(OCF_2 CF)_f O(C_g F_{2g} O)_h (CFCF_2 O)_i C_e F_{2e}\text{—} \quad (3)$$
$$\qquad\qquad\quad |\qquad\qquad\qquad\quad |$$
$$\qquad\qquad\quad Y\qquad\qquad\qquad\quad Y$$

wherein Y is, independently of each other, F or a $CF_3$ group; e is an integer of from 1 to 3; g is an integer of from 2 to 6, f and i each are an integer of from 0 to 100, provided that a total of f and i is from 2 to 100; and h is an integer of from 0 to 6; and wherein these repeating units may be sequenced at random, $$\text{—}C_e F_{2e}(OCF_2 CF_2 CF_2)_j OC_e F_{2e}\text{—} \quad (4)$$

wherein j is an integer of from 1 to 100 and e is an integer of from 1 to 3, $$\text{—}C_e F_{2e}(OCF_2 CF)_k (OCF_2)_l OC_e F_{2e}\text{—} \quad (5)$$
$$\qquad\qquad\quad |$$
$$\qquad\qquad\quad Y$$

wherein Y is F or a $CF_3$ group; e is an integer of from 1 to 3; k and l each are an integer of from 0 to 100, provided that a total of k and l is from 2 to 100; and wherein these repeating units may be sequenced at random.

The group represented by the following formula (6) is also preferred.

$$\text{—}CF_2(OCF_2 CF_2)_m (OCF_2)_n OCF_2\text{—} \quad (6)$$

wherein m is an integer of from 0 to 50, n is an integer of from 1 to 50, provided that a total of m and n is an integer of from 2 to 60.

The total number of the repeating units in the afore-mentioned chemical structural formulas is preferably in the range of from 2 to 80, and more preferably from 10 to 50.

Q in formula (1) is a group linking Rf with Z. Preferably, Q is an organic group with 3 to 12 carbon atoms and having an amide group, an ether group, an ester group or a vinyl group. Examples of Q include the following.

—$CH_2 OCH_2 CH_2 CH_2$— —$CF_2 OCH_2 CH_2 CH_2$—

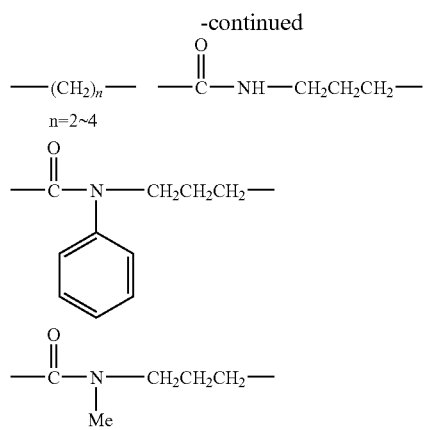
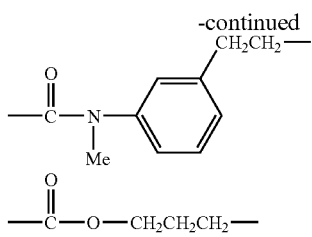
In each group described above, Rf is bonded to the left side; and Z, to the right side.
In formula (1), Z is a trivalent or higher polyorganosiloxane group having at least three siloxane bonds and optionally having one or more selected from an oxygen atom, a nitrogen atom, a silicon atom and a sulfur atom. Examples of Z include the following.
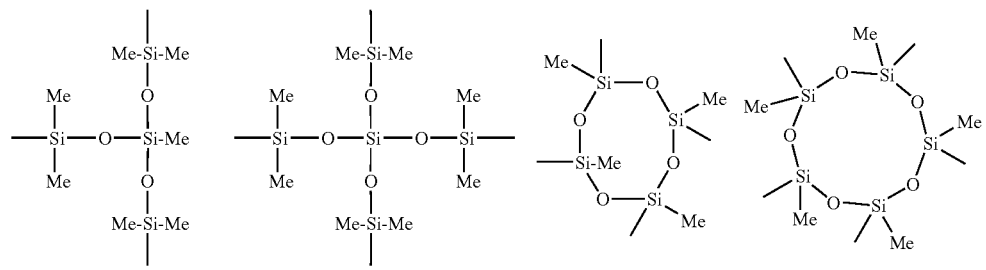
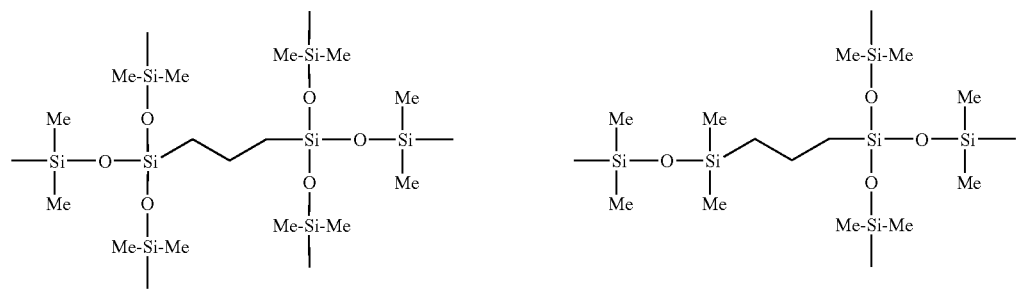
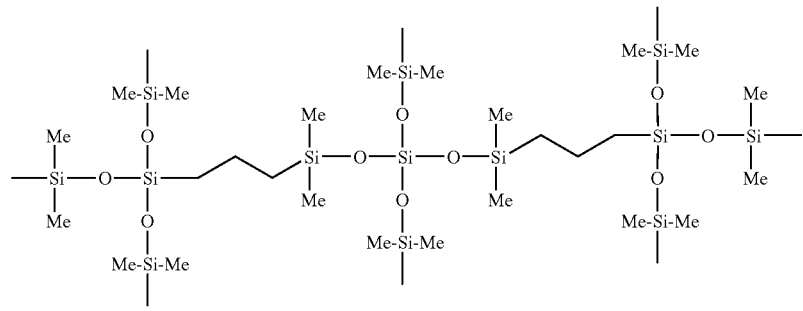
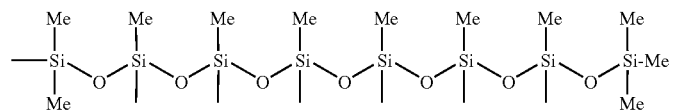

An example of a method for the preparation of the polyorganosiloxane of the present invention will be described below. First, a compound which is represented by the following formula and has unsaturated groups on both sides of Rf, Q'RfQ' is addition reacted with an organohydrogenpolysiloxane which has SiH bonds at sites where Q, A, and R are to be bonded and which results in the residue Z. Examples of Q' include the following.

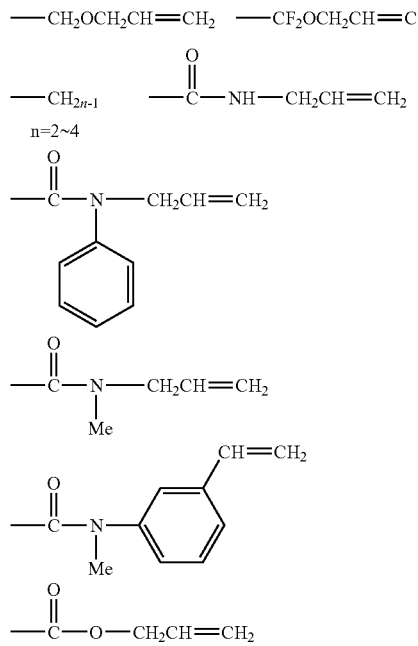

Then, a compound having an unsaturated group and represented by the following formula for deriving a structure of formula (2),

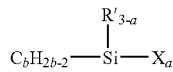

wherein R', X, a, and b are as defined above, and a compound which has an unsaturated bond on the end and which results in the residue R, for instance, 1-decene, are addition reacted with the unreacted SiH bonds remaining in a moiety from the organohydrogenpolysiloxane. The addition reaction can be carried out in the presence of an addition reaction catalyst, such as a platinum compound, according to a conventional method.

The present invention provides a surface treating agent composition comprising, as an essential component, the afore-mentioned perfluoropolyether group-containing polyorganosiloxane and/or a partial hydrolysis condensate thereof. The composition may further comprise, if needed, a catalyst for hydrolysis condensation, for instance, organic titanium compounds such as tetra-n-butyltitanate; organic tin compounds such as dibutyltin dimethoxide and dibutyltin dilaurate; organic acids such as acetic acid, methanesulfonic acid, and carboxylic acid; inorganic acids such as hydrochloric acid and sulfuric acid. If these catalysts are fluorinated, such are much preferred for solubility. Among these, acetic acid, tetra-n-butyltitanate, and perfluorocarboxylic acids are particularly desirable. The amount to be added is a catalytic amount, generally, 0.01 to 5 parts by weight, particularly 0.1 to 1 part by weight, relative to 100 parts by weight of the polyorganosiloxane and/or the partial hydrolysis condensate thereof.

The composition may comprise an appropriate solvent. Examples of the solvent include fluorinated aliphatic hydrocarbon solvents such as perfluoroheptane and perfluorooctane; fluorinated aromatic hydrocarbon solvents such as m-xylenehexafluoride and benzotrifluoride; fluorinated ether solvents such as methyl perfluorobutylether and perfluoro(2-butyltetrahydrofurane); fluorinated alkylamine solvents such as perfluorotributylamine and perfluorotripentylamine; hydrocarbon solvents such as petroleum benzine, mineral spirits, toluene, and xylene; and ketone solvents such as acetone, methyl ethyl ketone, and methyl isobutyl ketone. Among these, fluorinated solvents are desirable for better solubility and wetting property. Particularly, m-xylenehexafluoride, perfluoro(2-butyltetrahydrofurane), and perfluorotributylamine are preferred.

Twos or more of the afore-mentioned solvents may be used. An amount of the solvent is preferably such that the content of the polyorganosiloxane of formula (1) and/or a partial hydrolysis condensate thereof is preferably 0.01 to 50% by weight, particularly 0.05 to 20% by weight.

The surface treating agent composition may be applied to a substrate generally in a thickness of from 0.1 nm to 5 micrometers, particularly from 1 to 100 nm, in any known application method, such as brushing, dipping, spraying, spin coating, and vapor deposition and, then, cured, for instance, at a temperature of from room temperature to 120 degrees C. in the case of brushing or dipping. The composition is desirably applied under humidification for promoting the curing.

A substrate is not limited to any particular one. Use may be made of various kinds of materials, such as paper, cloth, metal or oxide thereof, glass, plastics, ceramic ware and ceramics. For instance, water- and oil-repellent treatment can be applied to paper, cloth, metal, glass, plastics and ceramics; a releasing treatment, to an adhesive tape, resin-shaping mold, and a roll; and stainproof treatment, to paper, cloth, metal, glass, plastics and ceramics.

The surface treating agent composition of the present invention can be used in the following applications: coating for preventing stain by fingerprint or sebum from adhering to lenses of spectacles and optical parts such as anti-reflection films; water-repellent, stainproof coating for sanitary products such as bathtubs and washbasins; stainproof coating for window glass of automobiles, trains, and airplanes and head lamp covers; water repellent, stainproof coating for building material for exterior wall; grease build-up preventing coating for kitchen building material; water repellent, stainproof, and bill-preventing coating for telephone booths; water repellent coating for preventing adhesion of fingerprint on artworks; coating for preventing adhesion of fingerprint on compact discs and DVD's; and for modifying flowability and dispersibility of paint additives, resin modifying agents, and inorganic fillers, or improving a lubrication property of tapes and films.

EXAMPLES

The present invention will be explained in detail by reference to the Examples and to the Comparative Examples, but shall not be limited thereto.

Example 1

In a reaction vessel, 500 g of the perfluoropolyether having alpha-unsaturated bonds on the both ends and represented by the following formula,

Rf—[CH$_2$—O—CH$_2$—CH=CH$_2$]$_2$ wherein Rf is the following group, p/q=0.9, and p+q=ca. 23 on average, hereinafter a total on average is referred to as "p+q",

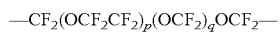
—CF$_2$(OCF$_2$CF$_2$)$_p$(OCF$_2$)$_q$OCF$_2$—

700 g of m-xylenehexafluoride, and 0.442 g of a solution of chloroplatinic acid/vinyl siloxane complex in toluene (containing 1.1×10$^{-7}$ mole of Pt) were mixed, and heated to 90 degrees C. with stirring. Then, 400 g of tetramethylcyclotetrasiloxane was added and aged at 90 degrees C. for 3 hours to confirm that the unsaturated bond disappeared on $^1$H-NMR. Subsequently, the reaction mixture was subjected to distillation under reduced pressure to obtain 515 g of a pale yellow, transparent liquid.

To a reaction vessel were added 100 g (0.02 mole) of the liquid obtained above, 100 g of m-xylenehexafluoride, and 0.0550 g of a solution of chloroplatinic acid/vinyl siloxane complex in toluene (containing 4.4×10$^{-6}$ mole of Pt) and heated to 90 degrees C. with stirring. Then, 9.8 g (0.06 mole) of vinyltrimethoxysilane and 9.2 g (0.06 mole) of 1-decene were added and aged at 90 degrees C. for 3 hours. The reaction mixture was subjected to distillation under reduced pressure to obtain 105.4 g of colorless, transparent liquid, hereinafter referred to as compound 1.

The $^1$H-NMR chart of compound 1 is shown in FIG. 1 and the chemical shifts are as shown below.

| | $^1$H NMR TMS Reference (ppm) |
|---|---|
| \Si—CH$_3$ | 0.14 |
| ≡Si—CH$_2$— | 0.60 |
| —CH$_3$ | 0.94 |
| *–(CH$_2$)–* | 1.34 |
| —O—CH$_2$—CH$_2$— | 1.73 |
| —Si(OCH$_3$)$_3$ | 3.56 |
| —CF$_2$—CH$_2$—O—CH$_2$— | 3.58 |
| —CF$_2$—CH$_2$—O— | 3.77 |

Based on the afore-mentioned results, the structure of the obtained compound is determined to be such represented by the following formula.

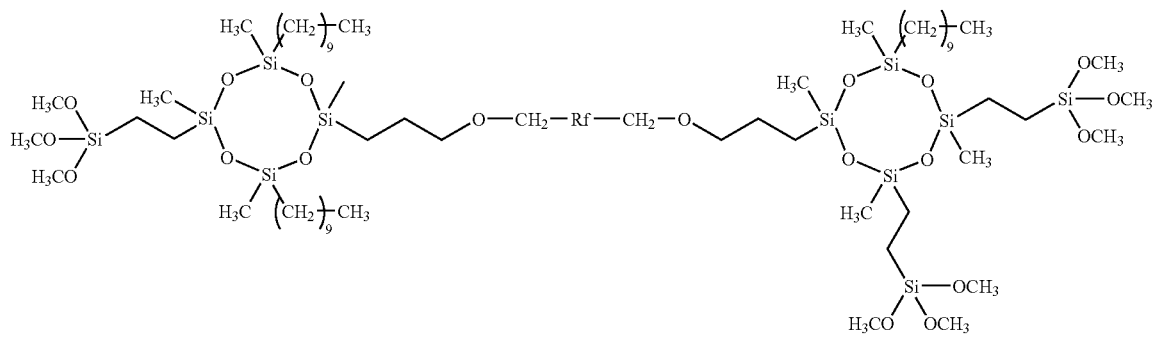

wherein Rf is as defined above.

Examples 2 to 7

Compounds 2 to 7 were obtained in the same manner as in Example 1, except that the olefins each in the table below were used instead of 1-decene used in Example 1.

| | |
|---|---|
| Compound 2 | 1-Dodecene |
| Compound 3 | 1-Tridecene |
| Compound 4 | 1-Tetradecene |
| Compound 5 | 1-Hexadecene |
| Compound 6 | 1-Heptadecene |
| Compound 7 | 1-Octadecene |

Examples 8 to 14

Compounds 8 to 14 were obtained in the same manner as in Example 1, except that a perfluoropolyether whose molecular chain is twice as long as that of the perfluoropolyether used in Example 1 (p/q=0.9, p+q=ca. 45), instead of the perfluoropolyether used in Example 1, and the olefins each in the following table were used.

| Compound 8  | 1-Decene      |
| Compound 9  | 1-Dodecene    |
| Compound 10 | 1-Tridecene   |
| Compound 11 | 1-Tetradecene |
| Compound 12 | 1-Hexadecene  |
| Compound 13 | 1-Heptadecene |
| Compound 14 | 1-Octadecene  |

Preparation of the Surface Treating Agent Composition

Each of the compounds 1 to 14 thus synthesized was dissolved in ethyl perfluorobutyl ether (HFE-7200, ex Sumitomo 3M Limited) to prepare a 0.3 wt % solution. In the surface treating agent compositions thus obtained each, a slide glass was dipped for ten seconds and then drawn up at a rate of 150 mm/min and left at 25 degrees C. and a humidity of 40% for 24 hours to form a cured film. These specimens were evaluated in the methods described below. The results are as shown in table 1.

Comparative Examples 1 to 7

Specimens were prepared and evaluated in the same manner as in the Examples, except that the following compounds 15 to 20 were used instead of the perfluoro-modified silanes, compounds 1 to 14, used in the Examples. For compound 21, the treatment was carried out in the method as described in patent literature 4, paragraph 0052, except that a slide glass was treated instead of a hard coated DVD disc.

Compound 15

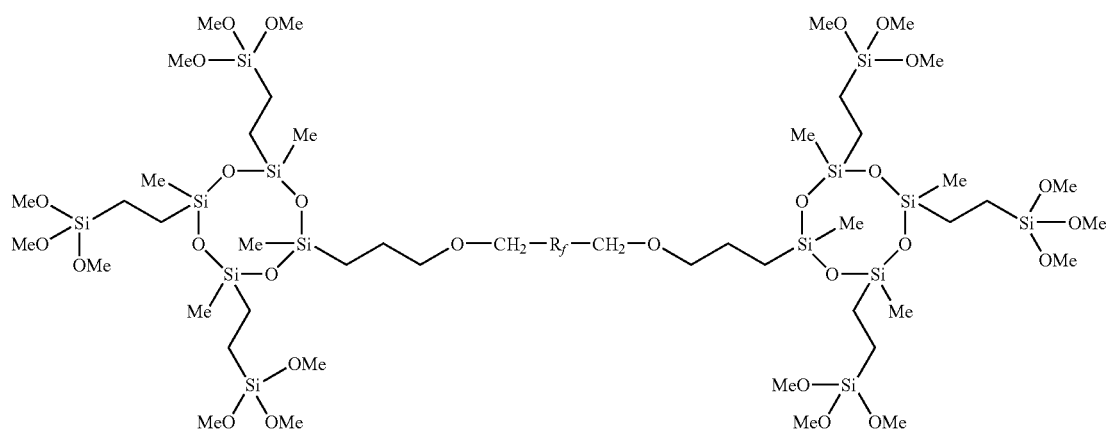

wherein Rf is the following group, $$-CF_2(OCF_2CF_2)_p(OCF_2)_qOCF_2-$$

(p/q=0.9, p+q=ca. 45).

Compound 16

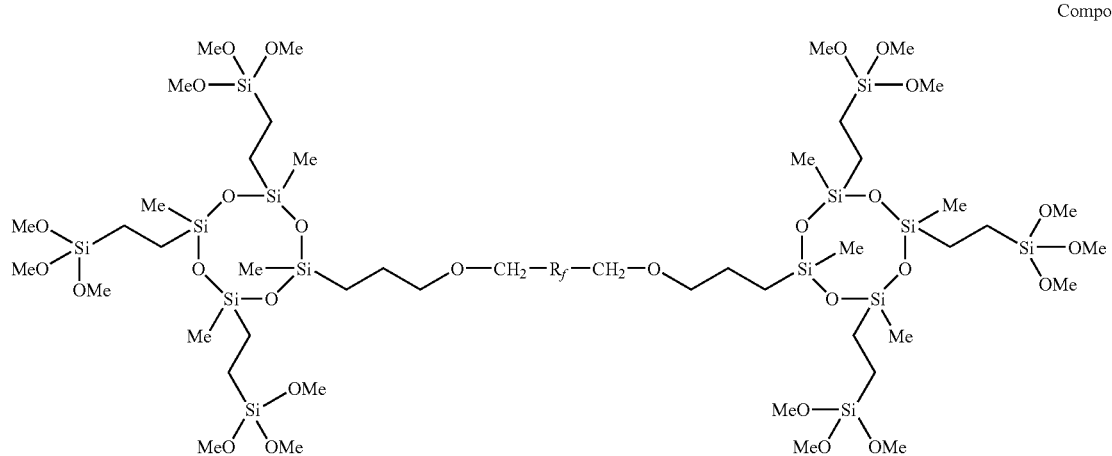

wherein Rf is the following group, $$-CF_2(OCF_2CF_2)_p(OCF_2)_qOCF_2-$$

(p/q=0.9, p+q=ca. 23).

Compound 17
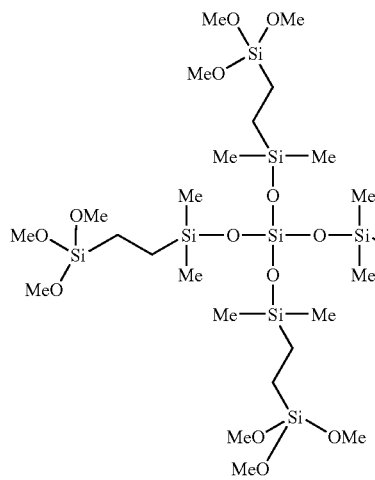
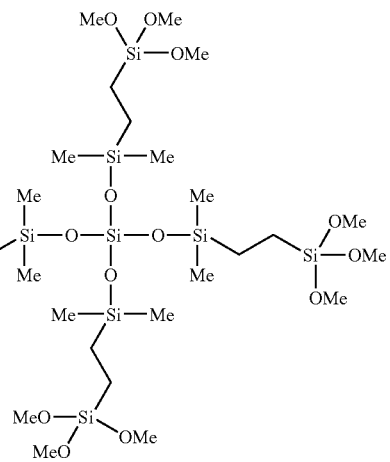
wherein Rf is the following group,
—CF$_2$(OCF$_2$CF$_2$)$_p$(OCF$_2$)$_q$OCF$_2$—   25
(p/q=0.9, p+q=ca. 45).
Compound 18
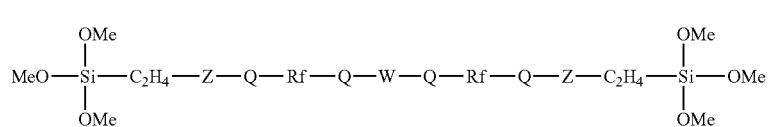
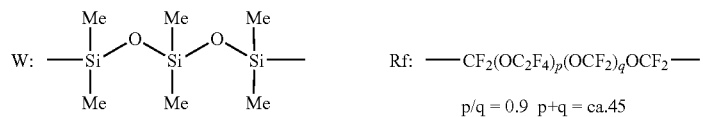
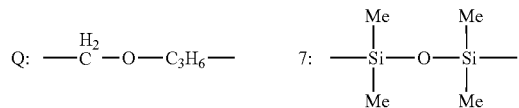
Compound 19
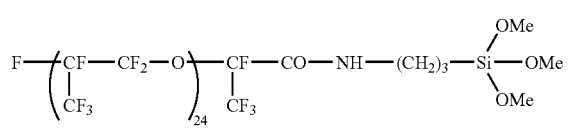
Compound 20
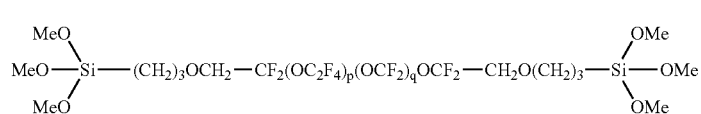
wherein Rf is the following group,
—CF$_2$(OCF$_2$CF$_2$)$_p$(OCF$_2$)$_q$OCF$_2$—   65
(p/q=0.9, p+q=ca. 45).

Compound 21: Octadecyltrichlorosilane

Comparative Example 8

A slide glass which was not surface treated was evaluated as in the Examples.

Water- and Oil-Repellency

Water contact angles and oleic acid contact angles of the cured coating were measured on a contact angle meter, Drop Master from Kyowa Interface Science Co., Ltd.

Evaluation A: Evaluation on How Much Stain is Unnoticeable

Sebum on a forehead was adhered to a finger and, then, an arc was drawn with the finger on surfaces of substrates which were treated with surface treating agent compositions each. The surfaces were observed visually to evaluate, based on the following criteria, whether the stain was noticeable.

++: stain was unnoticeable,
+: stain was noticeable, but not uneasy, and
−: stain was noticeable.

Evaluation B: Evaluation of Wiping Property of Sebum Stain

The afore-mentioned sebum stain was wiped off with tissue paper to visually observe the surface after wiping and evaluate the wiping property based on the following criteria:

++: stain was completely wiped off,
+: stain became less noticeable but was still visible when light was let to enter obliquely, and
−: stain was noticeable or stain was unnoticeable but remained adhered clearly.

Evaluation C: Evaluation of Marking Ink-wiping Off Property

A line was drawn on a treated surface with a black marking pen from Zebra Co., Ltd., High Macky. Then, the marking ink was dried and wiped off with tissue paper. The surfaces after wiped off were visually observed and evaluated based on the following criteria:

++: trace of marking ink did not remain,
+: pale trace of the marking ink remained after wiping, and
−: trace of the marking ink was noticeable.

The composition of the Examples showed less noticeable stain by sebum, maintaining a wiping property as easy as that of the Comparative Examples.

Industrial Applicability

The perfluoropolyether group-containing polyorganosiloxane of the present invention provides a surface where stain, if adheres, is unnoticeable and is suitable for treating surfaces of instruments where deterioration of visibility due to stain is problem such as mobile phones, PDA's, portable music players, car navigation equipment, television sets, and liquid crystal monitors.

The invention claimed is:

1. A perfluoropolyether group-containing polyorganosiloxane represented by the following formula (1),

$$A_k(R)_n Z\text{-}Q\text{-}Rf\text{-}Q\text{-}Z(R)_n A_k \quad (1)$$

wherein Rf is a divalent perfluoropolyether group; Q is a divalent group linking Rf with Z; Z is a polyorganosiloxane group having at least three siloxane bonds with its valency being trivalent to undecavalent; R is a monovalent organic group having 8 to 40 carbon atoms, n is an integer of from 1 to 8; A is a group represented by the following formula (2); and k is an integer of from 1 to 9, provided that n+k=(the valency of Z−1),

$$-\!\!-\!\!(CH_2)_b\!\!-\!\!\underset{\underset{X_a}{|}}{\overset{R'_{3-a}}{Si}} \quad (2)$$

wherein R' is an alkyl group having 1 to 4 carbon atoms or a phenyl group; X is a hydrolysable group, a is 2 or 3; and b is an integer of from 2 to 10.

2. The polyorganosiloxane according to claim 1, wherein R is a tetradecyl group or a hexadecyl group and n is from 1 to 3.

TABLE 1

|  |  | Water contact angle (°) | Oleic acid contact angle (°) | Evaluation A | Evaluation B | Evaluation C |
|---|---|---|---|---|---|---|
| Example 1 | Compound 1 | 106 | 57 | + | ++ | ++ |
| Example 2 | Compound 2 | 106 | 60 | + | ++ | ++ |
| Example 3 | Compound 3 | 106 | 61 | + | ++ | ++ |
| Example 4 | Compound 4 | 102 | 42 | ++ | ++ | ++ |
| Example 5 | Compound 5 | 99 | 46 | ++ | ++ | ++ |
| Example 6 | Compound 6 | 100 | 46 | ++ | ++ | ++ |
| Example 7 | Compound 7 | 101 | 48 | ++ | ++ | ++ |
| Example 8 | Compound 8 | 107 | 53 | + | ++ | ++ |
| Example 9 | Compound 9 | 106 | 56 | + | ++ | ++ |
| Example 10 | Compound 10 | 106 | 56 | + | ++ | ++ |
| Example 11 | Compound 11 | 105 | 55 | + | ++ | ++ |
| Example 12 | Compound 12 | 105 | 52 | + | ++ | ++ |
| Example 13 | Compound 13 | 105 | 57 | + | ++ | ++ |
| Example 14 | Compound 14 | 107 | 53 | + | ++ | ++ |
| Com. Example 1 | Compound 15 | 108 | 67 | − | ++ | ++ |
| Com. Example 2 | Compound 16 | 106 | 66 | − | ++ | ++ |
| Com. Example 3 | Compound 17 | 108 | 68 | − | ++ | ++ |
| Com. Example 4 | Compound 18 | 109 | 66 | − | ++ | ++ |
| Com. Example 5 | Compound 19 | 113 | 73 | − | ++ | ++ |
| Com. Example 6 | Compound 20 | 110 | 70 | − | ++ | ++ |
| Com. Example 7 | Compound 21 | 103 | 42 | ++ | − | − |
| Com. Example 8 | None | 18 | 34 | − | − | − |

"Com. Example" in the table above means comparative example.

3. The polyorganosiloxane according to claim 1 or 2, wherein Rf in formula (1) is a group represented by the following formula, $$—(C_cF_{2c}O)_d—$$  (5)

wherein c is an integer of from 1 to 6 and d is an integer of from 1 to 100.

4. The polyorganosiloxane according to claim 3, wherein Rf is a group represented by the following general formula (3), (4), or (5), $$—C_eF_{2e}(OCF_2CF)_fO(C_gF_{2g}O)_h(CFCF_2O)_iC_eF_{2e}—$$ (3)
$$\qquad\qquad |\qquad\qquad\qquad |$$
$$\qquad\qquad Y\qquad\qquad\qquad Y$$

wherein Y is, independently of each other, F or a $CF_3$ group; e is an integer of from 1 to 3; g is an integer of from 2 to 6, f and i each are an integer of from 0 to 100, provided that a total of f and i is from 2 to 100; and h is an integer of from 0 to 6; and wherein these repeating units may be sequenced at random, $$—C_eF_{2e}(OCF_2CF_2CF_2)_jOC_eF_{2e}—$$ (4)

wherein j is an integer of from 1 to 100; and e is an integer of from 1 to 3, $$—C_eF_{2e}(OCF_2CF)_k(OCF_2)_lOC_eF_{2e}—$$ (5)
$$\qquad\qquad |$$
$$\qquad\qquad Y$$

wherein Y is F or a $CF_3$ group; e is an integer of from 1 to 3; and k and l each are an integer of from 0 to 100, provided that a total of k and l is from 2 to 100; and wherein these repeating units may be sequenced at random.

5. The polyorganosiloxane according to claim 3, wherein Rf in formula (1) is a group represented by the following formula (6), $$—CF_2(OCF_2CF_2)_m(OCF_2)_nOCF_2—$$ (6)

wherein m=0-50, n=1-50, and m+n=2-60.

6. The polyorganosiloxane according to any one of claims 1 to 5, wherein Q in formula (1) is a group having an amide bond, an ether bond, an ester bond or a vinyl bond.

7. The polyorganosiloxane according to any one of claims 1 to 6, wherein Z in formula (1) is a group represented by either one of the following formulas

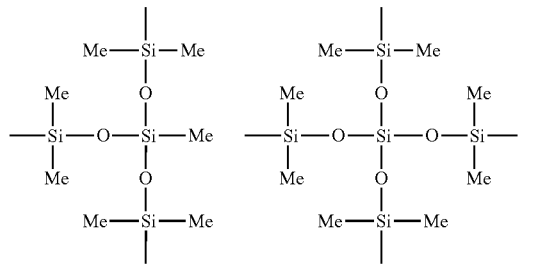

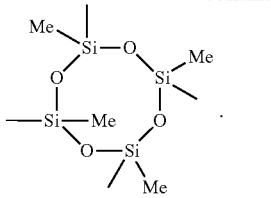

8. The polyorganosiloxane according to any one of claims 1 to 7, wherein X is a methoxy group or an ethoxy group.

9. A surface treating agent composition comprising:
a perfluoropolyether group-containing polyorganosiloxane represented by the following formula (1) and/or
a partial hydrolysis condensate thereof, $$A_k(R)_nZ\text{-}Q\text{-}Rf\text{-}Q\text{-}Z(R)_nA_k$$ (1)

wherein Rf is a divalent perfluoropolyether group; Q is a divalent group linking Rf with Z; Z is a polyorganosiloxane group having at least three siloxane bonds with its valency being trivalent to undecavalent; R is a monovalent organic group having 8 to 40 carbon atoms, n is an integer of from 1 to 8; A is a group represented by the following formula (2); and k is an integer of from 1 to 9, provided that n+k=(the valency of Z−1), $$\qquad\qquad\qquad R'_{3-a}$$
$$\qquad\qquad\qquad |$$
$$—(CH_2)_b—Si—X_a$$ (2)

wherein R' is an alkyl group having 1 to 4 carbon atoms or a phenyl group; X is a hydrolysable group, a is 2 or 3; and b is an integer of from 2 to 10.

10. An article having, on the surface thereof, a cured coating made from a perfluoropolyether group-containing polyorganosiloxane represented by the following formula (1) and/or a partial hydrolysis condensate thereof, $$A_k(R)_nZ\text{-}Q\text{-}Rf\text{-}Q\text{-}Z(R)_nA_k$$ (1)

wherein Rf is a divalent perfluoropolyether group; Q is a divalent group linking Rf with Z; Z is a polyorganosiloxane group having at least three siloxane bonds with its valency being trivalent to undecavalent; R is a monovalent organic group having 8 to 40 carbon atoms, n is an integer of from 1 to 8; A is a group represented by the following formula (2); and k is an integer of from 1 to 9, provided that n+k=(the valency of Z−1), $$\qquad\qquad\qquad R'_{3-a}$$
$$\qquad\qquad\qquad |$$
$$—(CH_2)_b—Si—X_a$$ (2)

wherein R' is an alkyl group having 1 to 4 carbon atoms or a phenyl group; X is a hydrolysable group, a is 2 or 3; and b is an integer of from 2 to 10.

11. The surface treating agent composition according to claim 9, wherein R is a tetradecyl group or a hexadecyl group and n is from 1 to 3.

12. The surface treating agent composition according to claim 9 or 11, wherein Rf in formula (1) is a group represented by the following formula,

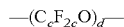

wherein c is an integer of from 1 to 6 and d is an integer of from 1 to 100.

13. The surface treating agent composition according to claim 12, wherein Rf is a group represented by the following general formula (3), (4), or (5),

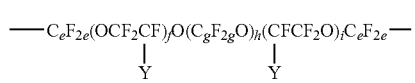

wherein Y is, independently of each other, F or a $CF_3$ group; e is an integer of from 1 to 3; g is an integer of from 2 to 6, f and i each are an integer of from 0 to 100, provided that a total of f and i is from 2 to 100; and h is an integer of from 0 to 6; and wherein these repeating units may be sequenced at random,

wherein j is an integer of from 1 to 100; and e is an integer of from 1 to 3,

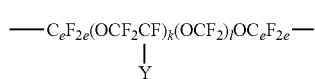

wherein Y is F or a $CF_3$ group; e is an integer of from 1 to 3; and k and l each are an integer of from 0 to 100, provided that a total of k and l is from 2 to 100; and wherein these repeating units may be sequenced at random.

14. The surface treating agent composition according to claim 12, wherein Rf in formula (1) is a group represented by the following formula (6), $$—CF_2(OCF_2CF_2)_m(OCF_2)_nOCF_2— \quad (6)$$

wherein m=0-50, n=1-50, and m+n=2-60.

15. The surface treating agent composition according to claim 9, wherein Q in formula (1) is a group having an amide bond, an ether bond, an ester bond or a vinyl bond.

16. The surface treating agent composition according to claim 9, wherein Z in formula (1) is a group represented by either one of the following formulas.

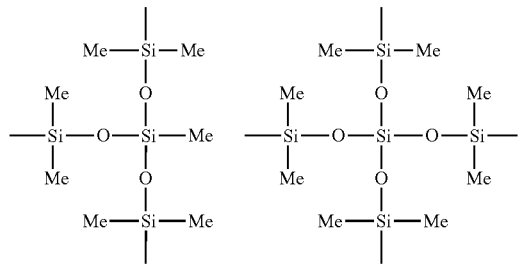

-continued

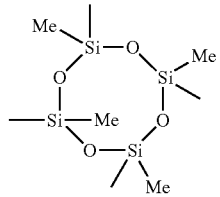

17. The surface treating agent composition according to claim 9, wherein X is a methoxy group or an ethoxy group.

18. The article according to claim 10, wherein R is a tetradecyl group or a hexadecyl group and n is from 1 to 3.

19. The article according to claim 10 or 18, wherein Rf in formula (1) is a group represented by the following formula,

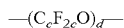

wherein c is an integer of from 1 to 6 and d is an integer of from 1 to 100.

20. The article according to claim 19, wherein Rf is a group represented by the following general formula (3), (4), or (5),

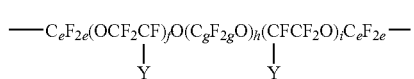

wherein Y is, independently of each other, F or a $CF_3$ group; e is an integer of from 1 to 3; g is an integer of from 2 to 6, f and i each are an integer of from 0 to 100, provided that a total of f and i is from 2 to 100; and h is an integer of from 0 to 6; and wherein these repeating units may be sequenced at random,

wherein j is an integer of from 1 to 100; and e is an integer of from 1 to 3,

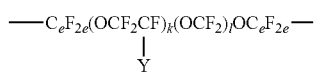

wherein Y is F or a $CF_3$ group; e is an integer of from 1 to 3; and k and l each are an integer of from 0 to 100, provided that a total of k and l is from 2 to 100; and wherein these repeating units may be sequenced at random.

21. The article according to claim 19, wherein Rf in formula (1) is a group represented by the following formula (6),

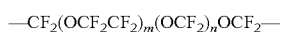

wherein m=0-50, n=1-50, and m+n=2-60.

22. The article according to claim 10, wherein Q in formula (1) is a group having an amide bond, an ether bond, an ester bond or a vinyl bond.

23. The article according to claim 10, wherein Z in formula (1) is a group represented by either one of the following formulas.
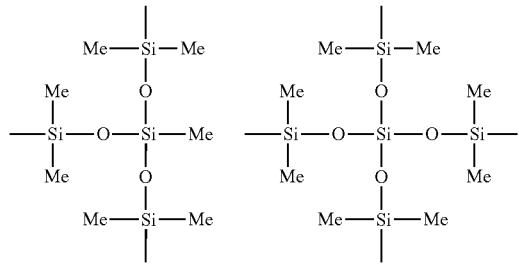
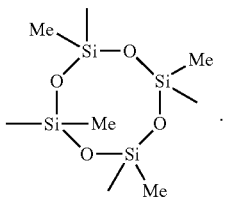
24. The article according to claim 10, wherein X is a methoxy group or an ethoxy group.
* * * * *